(12) United States Patent
Meister et al.

(10) Patent No.: US 11,774,688 B2
(45) Date of Patent: *Oct. 3, 2023

(54) PHOTONIC COMPONENT AND METHOD FOR PRODUCTION THEREOF

(71) Applicant: Sicoya GmbH, Berlin (DE)

(72) Inventors: Stefan Meister, Berlin (DE); Moritz Grehn, Berlin (DE); Sven Otte, Hohen Neuendorf (DE); Sebastian Höll, Berlin (DE)

(73) Assignee: SICOYA GMBH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,348

(22) Filed: Jan. 29, 2021

(65) Prior Publication Data
US 2022/0244473 A1 Aug. 4, 2022

(51) Int. Cl.
*G02B 6/42* (2006.01)
*G02B 6/38* (2006.01)
*G02B 6/26* (2006.01)

(52) U.S. Cl.
CPC ............. *G02B 6/4214* (2013.01); *G02B 6/26* (2013.01); *G02B 6/3853* (2013.01); *G02B 6/4231* (2013.01)

(58) Field of Classification Search
CPC ...... G02B 6/4214; G02B 6/26; G02B 6/3853; G02B 6/4231
USPC ......................................................... 385/14
See application file for complete search history.

(56) References Cited

U.S. PATENT DOCUMENTS

| | | | |
|---|---|---|---|
| 7,559,702 B2 | 7/2009 | Fujiwara et al. | |
| 8,083,418 B2 | 12/2011 | Fujiwara et al. | |
| 8,317,411 B2 | 11/2012 | Fujiwara et al. | |
| 10,948,666 B2 * | 3/2021 | Meister ................ | G02B 6/4219 |
| 2002/0097962 A1 | 7/2002 | Yoshimura et al. | |

(Continued)

FOREIGN PATENT DOCUMENTS

| | | |
|---|---|---|
| CN | 1487628 A | 4/2004 |
| CN | 101176024 A | 5/2008 |

(Continued)

OTHER PUBLICATIONS

First Chinese Office Action dated Apr. 6, 2021 issued by the Chinese Patent Office in related Chinese Application No. 201880028846.2.

(Continued)

*Primary Examiner* — Jerry M Blevins
(74) *Attorney, Agent, or Firm* — Gordon Rees Scully; Mansukhani, LLP

(57) ABSTRACT

A photonic component having a photonically integrated chip and a fibre mounting, wherein the fibre mounting has: at least one groove, into which an optical fibre is placed, and at least one mirror surface, which reflects radiation from the fibre in the direction of the photonically integrated chip and/or reflects radiation from the photonically integrated chip in the direction of the fibre. A chip stack comprising at least two chips is arranged between the photonically integrated chip and the fibre mounting, the chip stack has at least two through holes and in each case a guide pin, which positions the chip stack and the fibre mounting relative to one another, passes through the at least two through holes of the chip stack.

7 Claims, 6 Drawing Sheets

(56) References Cited

U.S. PATENT DOCUMENTS

Figure 1:
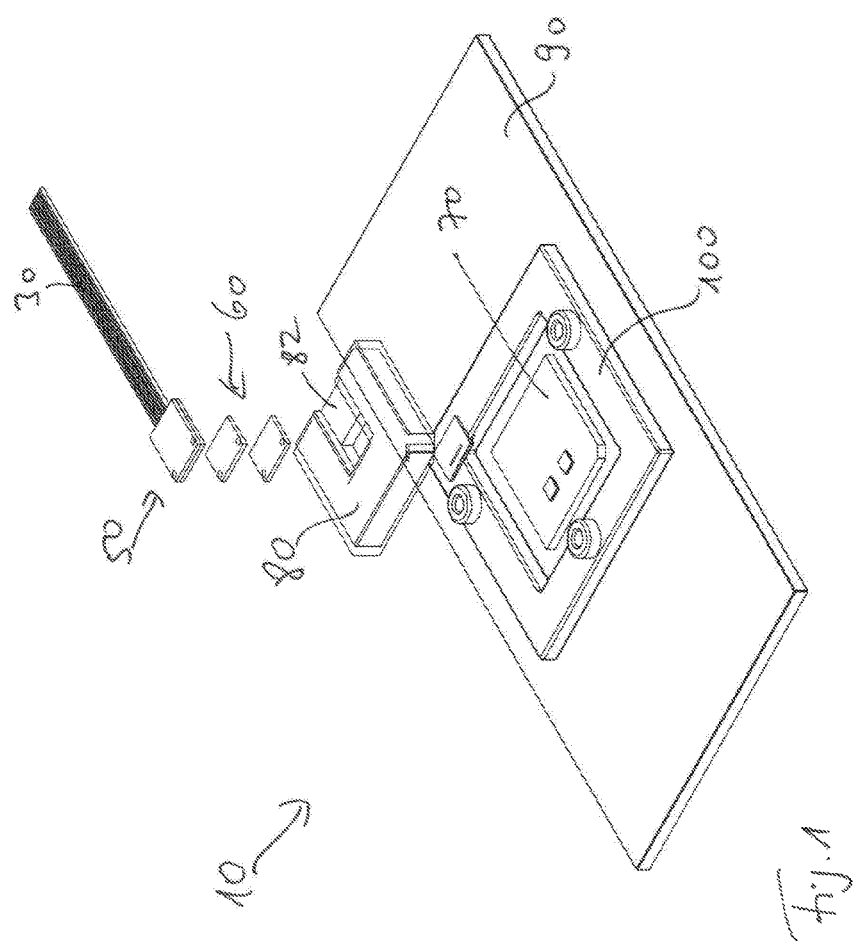

| | | |
|---|---|---|
| 2004/0043668 A1 | 3/2004 | Ikuta |
| 2006/0280410 A1 | 12/2006 | Fujiwara et al. |
| 2008/0175544 A1 | 7/2008 | Fujiwara et al. |
| 2008/0266638 A1 | 10/2008 | Shinoda et al. |
| 2009/0245737 A1 | 10/2009 | Fujiwara et al. |
| 2011/0064358 A1 | 3/2011 | Nishimura |
| 2012/0027346 A1 | 2/2012 | Castagna et al. |
| 2012/0063729 A1 | 3/2012 | Fujiwara et al. |
| 2013/0050656 A1 | 2/2013 | Mochizuki |
| 2013/0259419 A1 | 10/2013 | Charbonneau-Lefort |
| 2014/0193116 A1 | 7/2014 | Bylander et al. |
| 2016/0282570 A1 | 9/2016 | Nishimura |
| 2017/0075082 A1 | 3/2017 | Aihara et al. |
| 2018/0017744 A1 | 1/2018 | Demeritt et al. |
| 2019/0179082 A1 | 6/2019 | Grehn et al. |

FOREIGN PATENT DOCUMENTS

| | | | |
|---|---|---|---|
| DE | 44 45 997 A1 | 6/1996 | |
| DE | 10 2016 215 076 A1 | 2/2018 | |
| DE | 102017208523 A1 * | 11/2018 | ........... G02B 6/4214 |
| EP | 1 884 810 A1 | 6/2008 | |
| JP | 2011-17925 A | 1/2011 | |
| JP | 2011-17928 A | 1/2011 | |
| JP | 2011017925 A | 1/2011 | |
| WO | 2012/158671 A1 | 11/2012 | |
| WO | 2016/140855 A1 | 9/2016 | |
| WO | 2016/148896 A1 | 9/2016 | |
| WO | 2016148896 A1 | 9/2016 | |

OTHER PUBLICATIONS

International Search Report dated Aug. 14, 2018 issued in related International PCT Application No. PCT/DE2018/200042; filed May 2, 2018.
German Examination Report dated Jan. 10, 2018 issued in related German Application No. 10 2017 208 523.1; filed May 19, 2017.
Ahmed Awny et al.; "a 40 GB/s Monolithically Integrated Linear Photonic Receiver in a 0.25 um BiCMOS SiGe: C Technology"; IEEE Microwave and Wireless Components Letters; vol. 25; No. 7; Jul. 2015; pp. 469-471.
Firefly Application Design Guide by Samtec; Mar. 2019; 12 pages.
European Office Action dated Dec. 3, 2021 issued by the European Patent and Trademark Office in related European Patent Application No. 18 730 636.0.

* cited by examiner

PHOTONIC COMPONENT AND METHOD FOR PRODUCTION THEREOF

The invention relates to a photonic component having a photonic integrated chip and a fiber mount mechanically connected to the photonic integrated chip, wherein the fiber mount comprises: at least one groove, in which an optical fiber, in particular a single-mode fiber, is inserted, and at least one mirror surface, which reflects radiation of the fiber in the direction of the photonic integrated chip and/or radiation of the photonic integrated chip in the direction of the fiber. Such a component is known from German patent specification DE 44 45 997.

The invention is based on the object of specifying a photonic component which may be manufactured cost-effectively and has the most compact possible structure.

This object is achieved according to the invention by a photonic component having the features according to claim 1. Advantageous embodiments of the component according to the invention are specified in dependent claims.

It is accordingly provided according to the invention that a chip stack having at least two chips, of which one borders the fiber mount and one borders the photonic integrated chip, is arranged between the photonic integrated chip and the fiber mount, the chip stack is provided with at least two through holes and a guide pin is guided through each of the at least two through holes of the chip stack, which guide pin extends into an associated positioning hole in the fiber mount and in the direction of the photonic integrated chip and positions at least the chip stack and the fiber mount in relation to one another.

One essential advantage of the component according to the invention can be seen in that the chip stack, the through holes and the guide pins jointly enable a simple, automatic alignment of the fiber mount, in particular, for example, with respect to one or more lenses in the beam path between the fiber mount and the photonic integrated chip.

With regard to a simple alignment with respect to the photonic integrated chip, it is considered to be advantageous if one guide pin is guided through each of the at least two through holes of the chip stack, which extends into an associated positioning hole in the fiber mount and an associated positioning hole in the photonic integrated chip and positions the photonic integrated chip, the chip stack and the fiber mount in relation to one another.

The through holes of the chip stack and the associated positioning holes are preferably aligned.

The positioning holes in the fiber mount are preferably through holes; this embodiment enables an insertion of the guide pins from the outside into the fiber mount.

It is considered to be advantageous with regard to the beam guiding of optical radiation between the fiber mount and the photonic integrated chip if the chip of the chip stack which borders the fiber mount is provided on its chip side facing toward the fiber mount with at least one lens, referred to hereafter as the first lens of the chip stack, the chip of the chip stack which borders the photonic integrated chip is also provided on its chip side facing toward the photonic integrated chip with at least one lens, referred to hereafter as the second lens of the chip stack, and the first and second lens delimit a common beam path through the chip stack.

The first and second lens are preferably opposite to one another.

The deviation between the optical path length between the lens surface of the first lens and the fiber and the optical path length between the lens surface of the second lens and a coupler of the photonic integrated chip is preferably less than 5% and/or less than twice the Rayleigh length of the beam focused by the first lens.

The chips of the chip stack, of the photonic integrated chip, and the fiber mount are preferably silicon chips.

The fiber mount, the chip of the chip stack which borders the fiber mount, and the guide pins are preferably fixedly connected to one another and jointly form a plug.

The photonic integrated chip and the chip which borders the photonic integrated chip are preferably fixedly connected to one another and form a plug receptacle, in particular a socket.

The guide pins of the plug are preferably inserted into the plug receptacle.

The chip stack preferably comprises at least one intermediate chip, which is arranged between the two above-mentioned outer chips of the chip stack and also comprises at least two associated through holes for the guide pins. The thickness of the intermediate chip is preferably at least 500 μm, so that the plug contact for the guide pins reserves sufficient depth such that the plug procedure is readily perceptible for a user.

The intermediate chip or chips preferably form a component of the plug or the plug receptacle.

The plug face of the plug resting on the plug receptacle is preferably planar, wherein the plug face is formed by the surface facing toward the plug receptacle of that chip which borders the fiber mount, or of the or one of the intermediate chips.

The face of the plug receptacle resting on the plug is preferably planar, wherein this face is formed by the surface facing toward the plug of that chip which borders the photonic integrated chip, or of the or one of the intermediate chips.

It is particularly advantageous if the inner faces of the chip of the chip stack resting on one another are planar and the first and second lens are introduced, in particular etched, into the surfaces on the outer sides of the chip stack.

The two lenses preferably have the same focal length. They are particularly preferably identical.

The chip which borders the fiber mount and the chip which borders the photonic integrated chip are preferably identical in consideration of a low piece count and low production costs.

It is considered to be advantageous with respect to the lens design if the first lens of the chip stack is formed in such a way that radiation from the fiber mount is guided as a collimated beam to the second lens, and the second lens of the chip stack is formed in such a way that radiation from the photonic integrated chip is guided as a collimated beam to the first lens of the chip stack.

The beam path between the first and the second lens preferably extends perpendicularly to the planar boundary surfaces between the chips of the chip stack.

The photonic integrated chip preferably comprises: a substrate, the substrate base material of which is a semiconductor material, in particular silicon, an integrated optical waveguide, which is integrated into at least one waveguiding material layer of the chip located on the substrate, a deflection unit, and a pocket hole, which extends from the substrate rear side up to a partition layer separating the substrate and the waveguiding material layer, wherein the deflection unit deflects radiation from the waveguide out of the plane of the waveguiding material layer in the direction of the pocket hole and substrate rear side and deflects radiation, which comes from the chip stack and has passed the pocket hole and the partition layer, into the plane of the waveguiding material layer.

The deflection unit preferably comprises a coupler, which is formed in the optical waveguide or is connected to the optical waveguide, and a mirror layer, which is located directly on the side of the waveguiding material layer facing away from the pocket hole, on an intermediate layer resting on the side of the waveguiding material layer facing away from the pocket hole, or on an intermediate layer stack resting on the side of the waveguiding material layer facing away from the pocket hole.

The coupler preferably deflects radiation of the waveguide partially out of the plane of the waveguiding material layer entirely or at least partially in the direction of the mirror layer.

The mirror layer, the pocket hole, and the coupler are preferably arranged and designed in such a way that the part of the radiation deflected in the direction toward the mirror layer is reflected by the mirror layer in the direction of the pocket hole.

The positioning hole in the photonic integrated chip is preferably a pocket hole, in particular a pocket hole which extends from the substrate rear side up to a partition layer separating the substrate and the waveguiding material layer.

The guide pins preferably each comprise a chamfered pin end.

The component preferably comprises a support element, on which the fiber and/or a support slat attached to the fiber rests.

The support element preferably forms a ring. The inner wall of the ring preferably tapers in an upper region, into which the plug is inserted, in a funnel shape and at least there causes a pre-alignment of the plug in relation to the plug receptacle during the insertion of the plug.

In a lower region of the inner wall, in which the plug receptacle is located, the inner wall preferably laterally abuts the plug receptacle.

It is also advantageous if the support element comprises a groove and the fiber or the support slat attached to the fiber rests in the groove on the support element.

The support element is preferably formed by a potting compound.

With respect to the fiber installation, it is advantageous if the groove in the fiber mount is a V-groove etched anisotropically in silicon and a deflection mirror associated with the fiber in the fiber mount is formed by a face etched anisotropically into the silicon.

The beam path between the first and the second lens is preferably not centrally incident on the first and/or second lens, but rather offset in relation to the respective lens center.

The acentricity of the beam path in relation to the first and second lens is preferably different in the first lens than in the second lens. Such a differing acentricity permits a lens-individual optimization of the imaging behavior of the lens.

The first and/or second lens are preferably aspheric.

The first and/or second lens are preferably elliptical.

The first and/or second lens are preferably coated using an antireflective coating.

At least two faces of the chips of the chip stack resting directly on one another, in particular the outer side of the plug and the outer side of the plug receptacle, are preferably each coated using an antireflective coating.

The chips of the plug and the chips of the plug receptacle are preferably connected to one another in a manner free of adhesive and/or solder, in particular by Van-der-Waals bonding or thermal fusion bonding. A connection without adhesive ensures optimum heat conduction and the transmitted beam does not experience any Fresnel losses.

In addition, it is advantageous if the photonic integrated chip comprises contacts for flip chip connections on the outer side facing away from the chip stack and the photonic integrated chip is bonded on a printed circuit board and is electrically connected to the printed circuit board using a flip chip method. Due to the separation of electrical and optical contacts on the upper and lower sides of the photonic integrated chip, more space is available on the chip lower side therein for the connection of the photonic integrated chip to the chip stack than in an alternative variant, in which the optical contacting is also carried out on the chip upper side. The mechanical stability of the chip stack in-creases due to the enlarged support surface.

The printed circuit board preferably forms a carrier for the support element. The support element mechanically stabilizes the chip stack together with the fiber mount, whereby lesser deformations and thus a more robust optical coupling can be achieved.

The printed circuit board preferably comprises contacts for a BGA (ball grid array) soldered bond on its lower side facing away from the support element.

The invention additionally relates to an optical plug for a component as described above. The plug is characterized in that it comprises a fiber mount, a chip which borders the fiber mount and at least two guide pins, the fiber mount, the chip and the guide pins are fixedly connected to one another, and the guide pins penetrate through holes through the chip and/or extend through these holes, the outer plug face of the plug is formed by the surface of the chip which borders the fiber mount or an outer chip connected thereto directly or indirectly via one or more further chips and is planar, the guide pins protrude perpendicularly out of the surface of the chip which borders the fiber mount or the outer chip in the case of multiple chips, and the chip which borders the fiber mount is provided with at least one lens on its chip side facing toward the fiber mount.

Reference is made to the above statements in conjunction with the advantages of the component according to the invention with respect to the advantages of the plug according to the invention.

The invention additionally relates to an optical plug receptacle for a component as described above. The plug receptacle is characterized in that it comprises a photonic integrated chip and at least one second chip which adjoins the photonic integrated chip, the photonic integrated chip and the second chip are fixedly connected to one another, through holes in the second chip and positioning holes in the photonic integrated chip align in pairs, the outer face of the plug receptacle is formed by the surface of the second chip or an outer chip connected thereto directly or indirectly via one or more further chips and is planar, and the second chip is provided with at least one lens on its chip side facing toward the photonic integrated chip.

Reference is made to the above statements in conjunction with the advantages of the component according to the invention with respect to the advantages of the plug receptacle according to the invention.

The invention additionally relates to a method for producing a photonic component as described above. It is provided according to the invention with respect to such a method that a plug as described above is plugged into a plug receptacle as described above.

Reference is made to the above statements in conjunction with the advantages of the component according to the invention with respect to the advantages of the method according to the invention.

Figure 2:
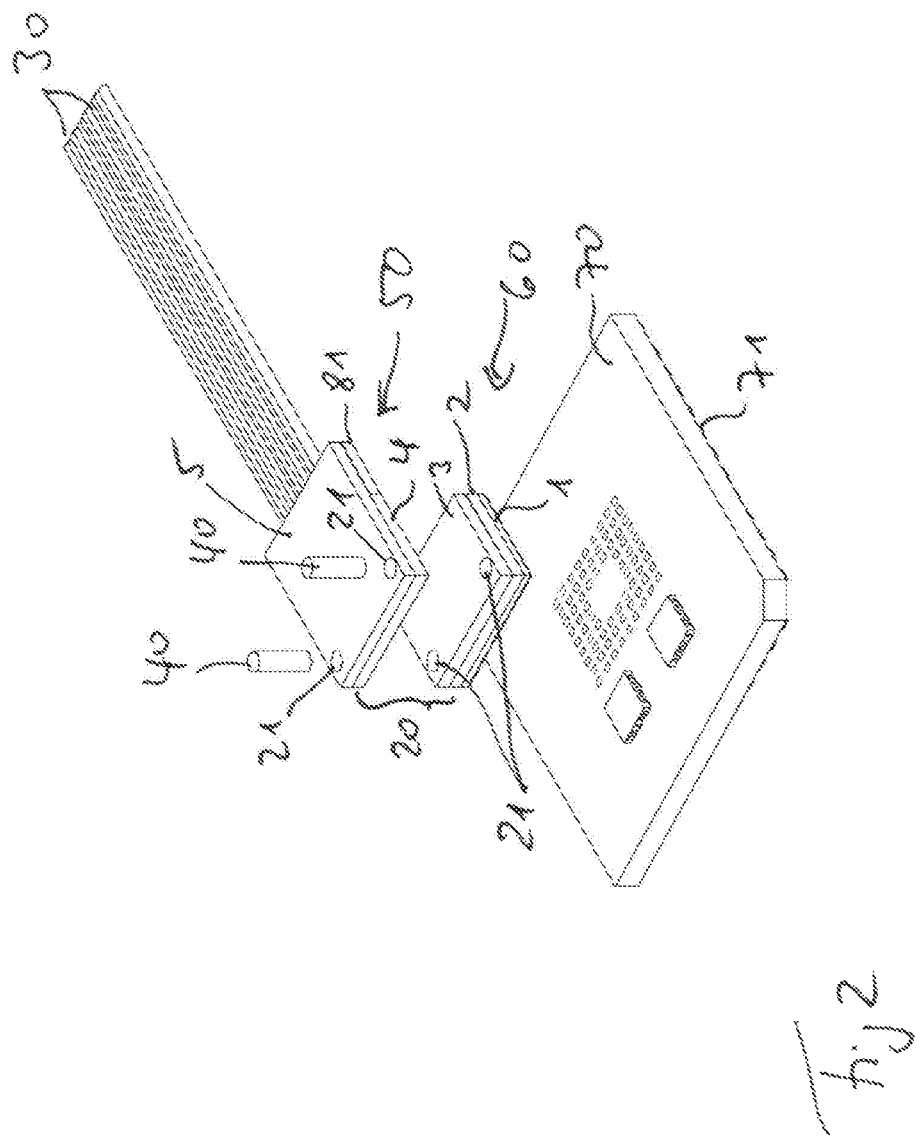
Figure 3:
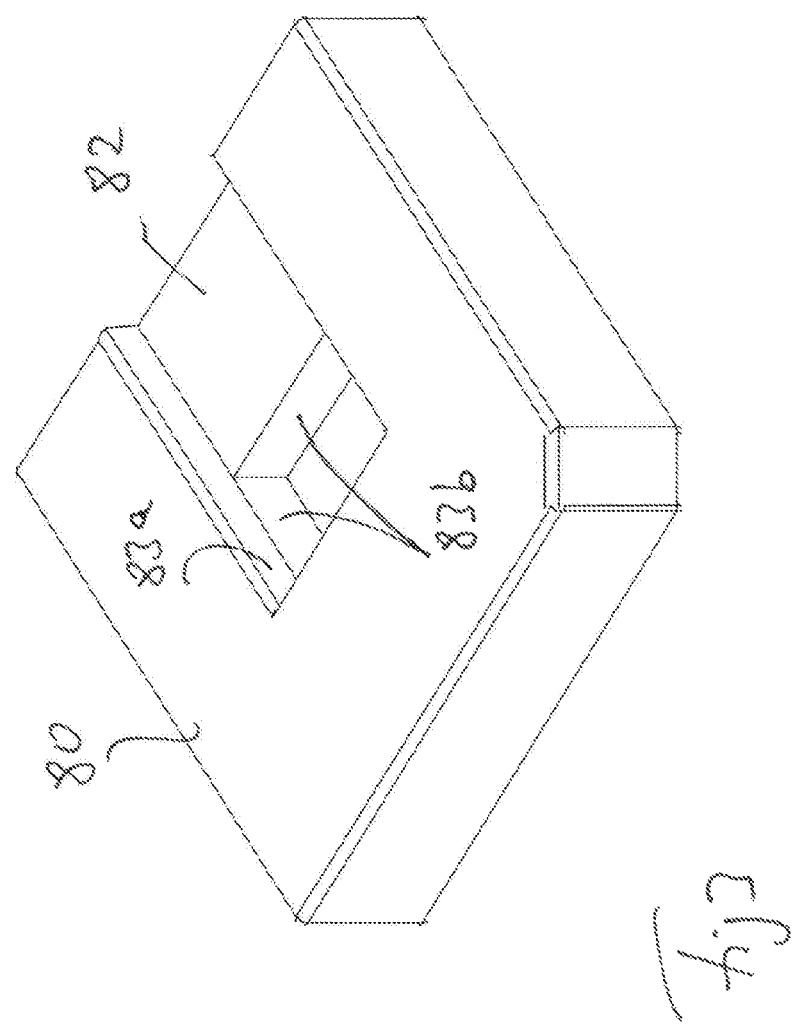
Figure 4:
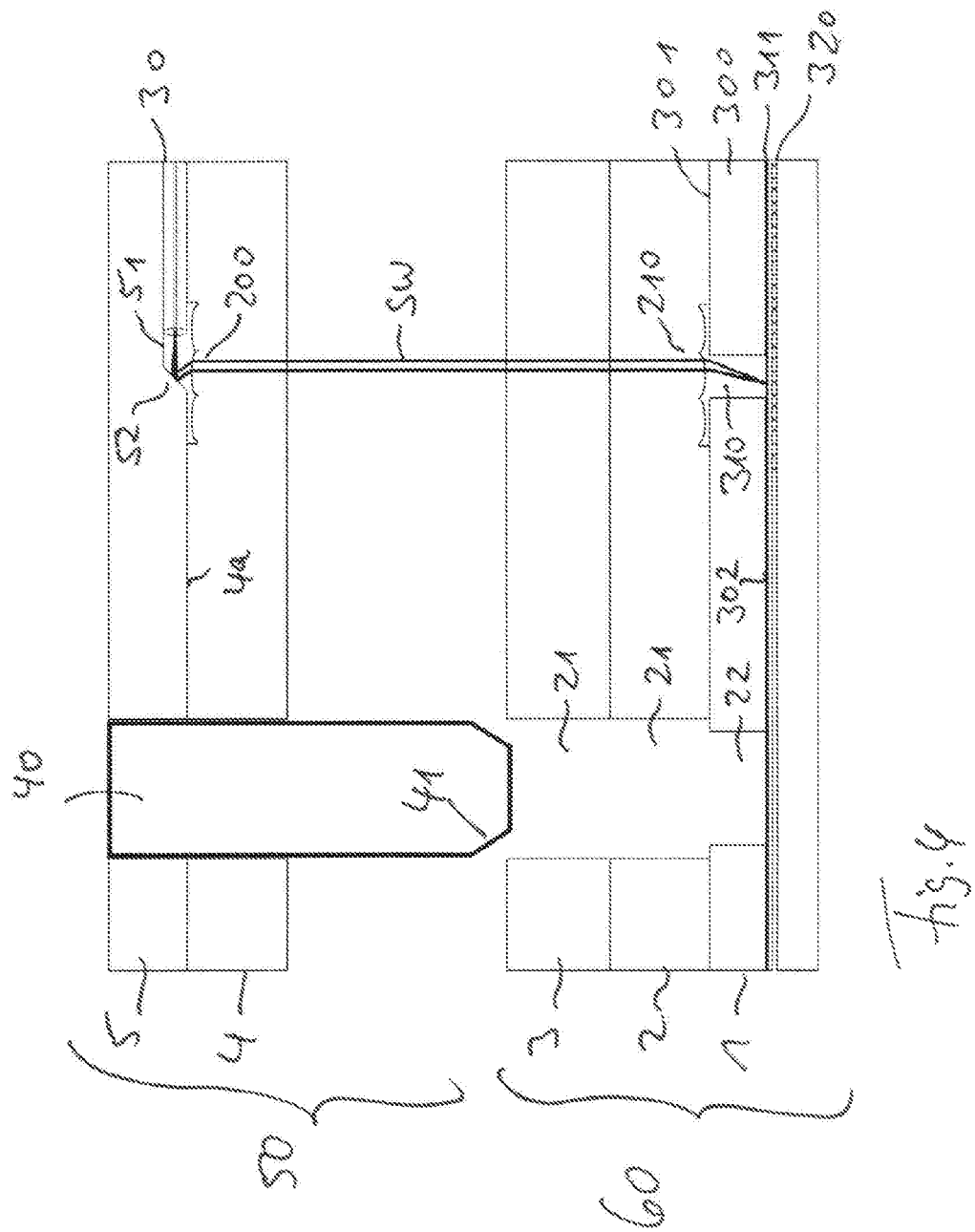
Figure 5:
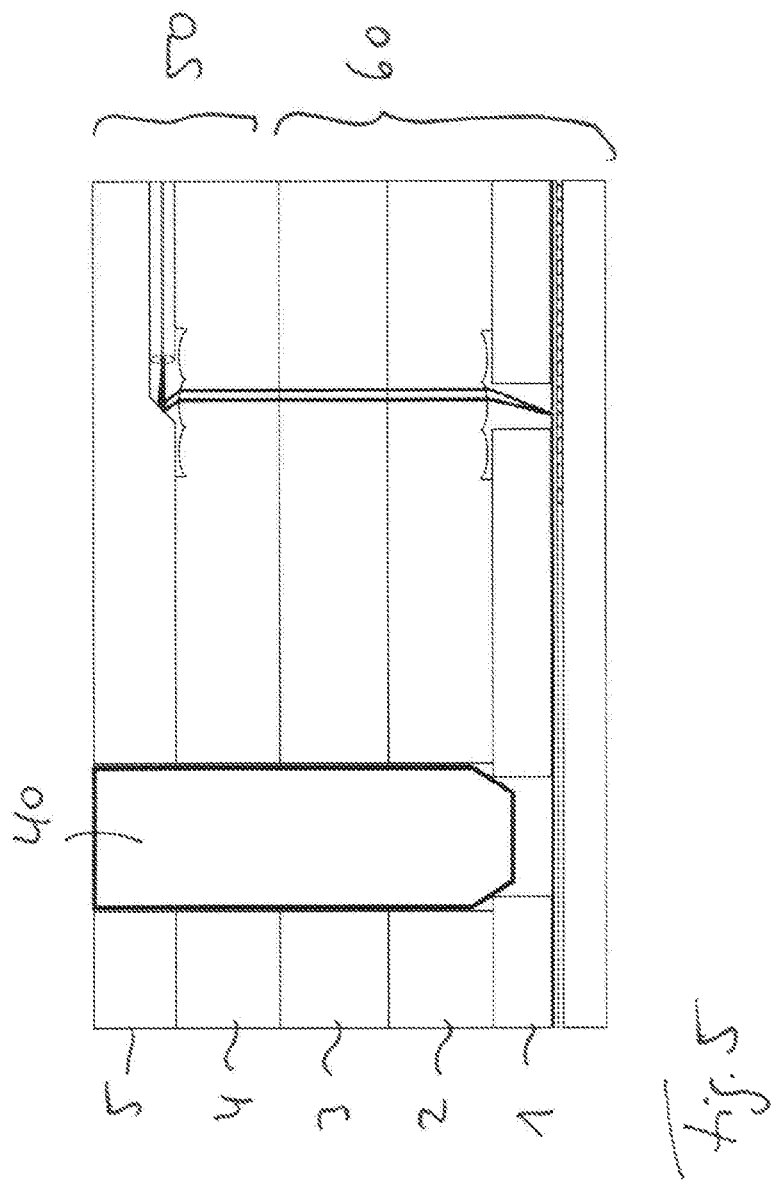
Figure 6:
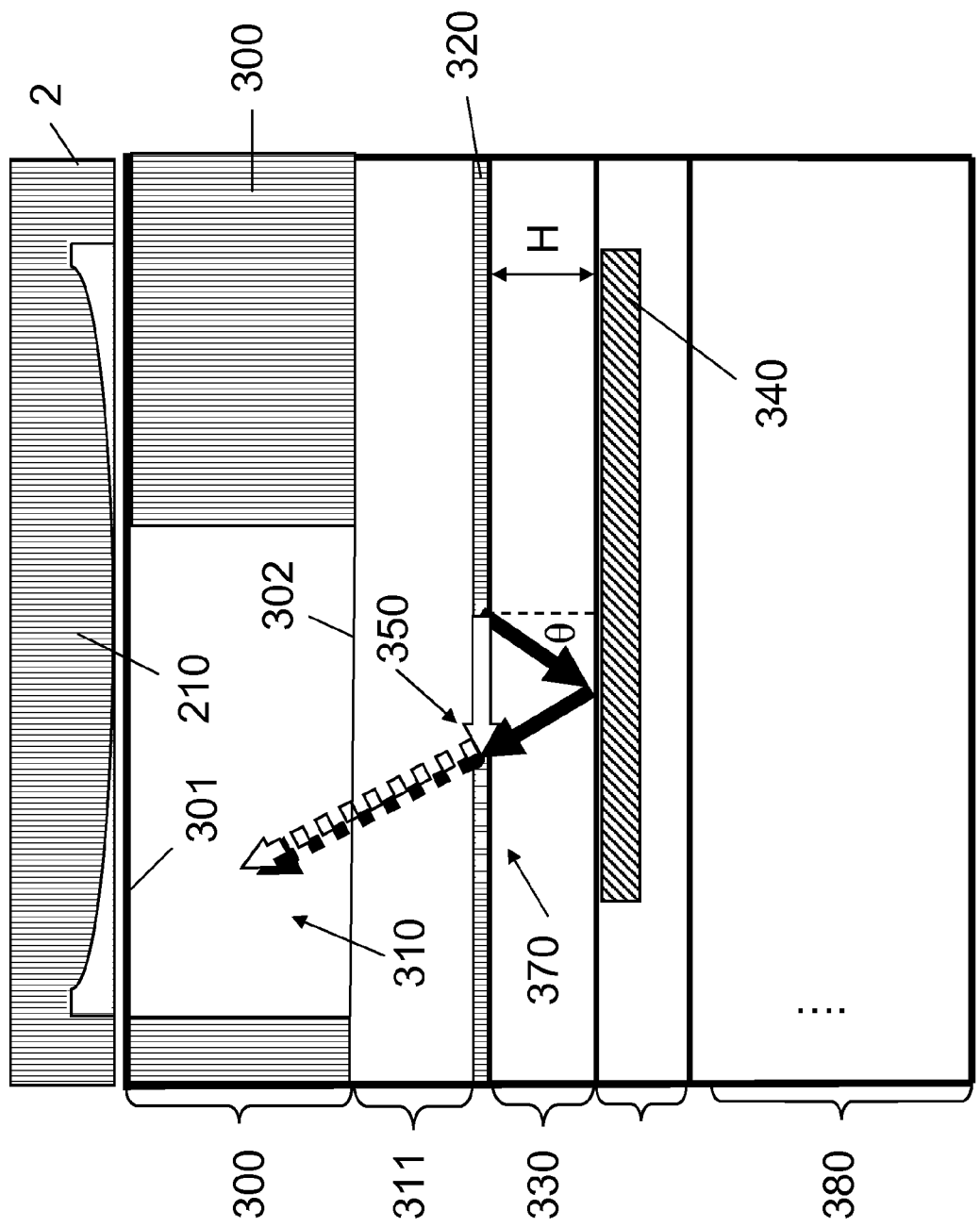

The invention is explained in greater detail hereafter on the basis of exemplary embodiments; in the exemplary figures:

FIG. 1 shows an exemplary embodiment of an optical component according to the invention in an exploded view diagonally from the side, FIG. 2 shows parts of the photonic component according to FIG. 1 in greater detail, FIG. 3 shows a support element of the photonic component according to FIG. 1 in a three-dimensional view diagonally from the side in greater detail, FIG. 4 shows a plug and a plug receptacle of the photonic component according to FIG. 1 in a cross section, wherein FIG. 4 shows a state during the insertion of the plug into the plug receptacle, FIG. 5 shows the plug and the plug receptacle according to FIG. 4 after the plug has been completely inserted into the plug receptacle, and FIG. 6 shows an exemplary embodiment of an advantageous embodiment of a photonic integrated chip of the photonic component according to FIG. 1 in greater detail.

In the figures, the same reference signs are always used for identical or comparable components for the sake of comprehensibility.

FIG. 1 shows an exemplary embodiment of a photonic component 10 in an exploded view diagonally from the side. FIG. 2 shows parts of the photonic component 10 according to FIG. 1 in greater detail. Reference is made jointly hereafter to FIGS. 1 and 2.

The photonic component 10 comprises a first chip, which is a photonic integrated chip 1. A second chip 2 adjoins the photonic integrated chip 1, which in turn adjoins, on its side facing away from the photonic integrated chip 1, a third chip, referred to as intermediate chip 3 hereafter.

A fourth chip 4 borders a fifth chip, which forms a fiber mount 5 of the photonic component 10.

For the relative installation of the second, third, fourth and fifth chips in relation to one another, they are provided with through holes 21, into each of which a guide pin 40, preferably a metal pin, can be inserted.

To enable a relative alignment also in relation to the photonic integrated chip 1 by means of the guide pins 40, the photonic integrated chip 1 is preferably provided with aligned positioning holes, preferably in the form of pocket holes, into which the guide pins 40 can engage.

The fourth chip 4, the fifth chip (the fiber mount 5), and the guide pins 40 preferably form a prefinished unit in the form of a plug 50 in the embodiment according to FIGS. 1 and 2.

The photonic integrated chip 1, the second chip 2 and the intermediate chip 3 preferably form a prefinished plug receptacle 60, into which the plug 50 can be inserted with its guide pins 40. The guide pins 40 are inserted in this case into the through holes 21 in the chips 2 and 3 and into the positioning holes in the photonic integrated chip 1.

The fiber mount 5 is used for mounting fibers 30, which are preferably single-mode fibers.

If the plug 50 is inserted into the plug receptacle 60, the third chip or the intermediate chip 3 and the fourth chip 4 rest directly on one another, so that the chips 2, 3 and 4 form a chip stack 20 having chips resting on one another. The chip stack 20 is delimited on the outside by the photonic integrated chip 1 and the fiber mount 5.

The photonic integrated chip 1 of the plug receptacle 60 is preferably equipped on the outer side facing away from the chip stack 20 with contacts, which enable a chip connection to an electrical printed circuit board 70.

The printed circuit board 70 is preferably installed on an electrical carrier plate 90. The printed circuit board 70 preferably has contacts which are suitable for a ball grid array soldered bond for installation on the electrical carrier plate 90. The contacts are located on the lower side 71 of the printed circuit board 70 facing away from the photonic integrated chip 1.

FIG. 1 additionally shows a support element 80, which is placed on the printed circuit board 70. The support element 80 is preferably formed by a potting compound and preferably has two functions: One of the two functions is to support the fibers 30 or a support slat 81 provided for holding the fibers 30 on the fiber mount 5 (for example, in the form of a sixth chip). For this purpose, the support element 80 preferably has a suitable groove 82. The other of the two functions of the support element 80 is to effectuate a pre-alignment of the plug 50 in relation to the plug receptacle 60 if the plug 50 is to be inserted into the plug receptacle 60. The support element 80 is formed ring-shaped for this purpose.

The support element 80 is shown more clearly in FIG. 3. It may be seen that the inner wall 83 of the ring formed by the support element 80 comprises an upper region 83a, which tapers in a funnel shape and thus effectuates a relative alignment of the plug in relation to the inner region of the support element 80 and the plug receptacle 60 located therein during the insertion of the plug 50.

In a lower region 83b, the inner wall 83 laterally abuts the plug receptacle 60 located therein (cf. FIGS. 1 and 2). In the lower region 83b, the inner wall 83 of the support element 80 preferably stands perpendicularly on the surface plane of the printed circuit board 70 located underneath it.

FIG. 1 additionally shows a carrier ring 100, in the inner ring region of which the electrical carrier plate 90 having the support element 80 located thereon are inserted. The carrier ring 100 is used, for example, to support a heat sink (not shown in the figures), which cools or "de-heats" the printed circuit board 70 and the electrical carrier plate 90.

The support element 80 is preferably formed by potting the inner ring region between the plug receptacle 60 and the inner edge of the carrier ring 100. The upper region 83a of the inner wall 83 can be formed, for example, by a demolding bevel of the potting compound forming the support element 80.

FIG. 4 shows the plug 50 and the plug receptacle 60 according to FIGS. 1 and 2 in greater detail.

It may be seen in FIG. 4 that the plug 50 is formed by the guide pins 40, the fourth chip 4 and the fifth chip (fiber mount 5) located above it. The fibers 30 are connected to the plug 50 according to FIG. 2, of which only one single fiber is viable in the cross-sectional illustration according to FIG. 4. It can be seen that the fiber 30 is located in a V-groove 51, which is etched into the silicon material of the fiber mount 5.

To deflect radiation which is decoupled from the fiber 30 or coupled therein, the fiber mount 5 comprises a respective associated deflection mirror 52 for each of the fibers 30, which is formed by a mirror surface anisotropically etched into the silicon material of the fifth chip or the fiber mount 5.

In addition, a lens, referred to hereafter as first lens 200, may be seen in FIG. 4, which is introduced, preferably etched, into the outer face 4a of the fourth chip 4 adjoining the fiber mount 5. In addition to the first lens 200, further first lenses can be introduced, in particular etched, into the outer face 4a, for example, for radiation into or out of another of the fibers which are shown in FIGS. 1 and 2.

The first lens 200 cooperates with a second lens 210, which is introduced, in particular etched, on the outer face 2a of the second chip 2 adjoining the photonic integrated chip 1. In addition to the second lens 210, still further second lenses can be introduced, in particular etched, on the outer face 2a, again, for example, for radiation into or out of another of the fibers, which are shown in FIGS. 1 and 2.

The first lens 200 and the second lens 210 are preferably directly opposite one another and preferably form a common beam path SW; the radiation preferably forms a collimated beam between the two lenses 200 and 210 on the beam path SW. The lenses 200 and 210 are preferably converging lenses.

In addition, the structure of the photonic integrated chip 1 may be seen in greater detail in FIG. 4. The photonic integrated chip 1 comprises a substrate 300, preferably a silicon substrate, the substrate rear side 301 of which borders the second chip 2 located above it in FIG. 4. In the region of the second lens 210, the substrate 300 is provided with a pocket hole 310, which extends from the substrate rear side 301 up to a partition layer 311, which is applied to the substrate front side 302 of the substrate 300. The partition layer 311 is preferably a SiO2 material.

A waveguiding material layer 320 preferably made of silicon is located on the side of the partition layer 311 facing away from the pocket hole 310. Radiation which is decoupled from the waveguiding material layer 320 by means of a deflection unit (not shown in greater detail in FIG. 4) in the direction of the substrate 300 passes the pocket hole 310 and is guided by means of the second lens 210 in the direction of the first lens 200. The first lens 200 guides the radiation S onto the deflection mirror 52, which couples the radiation S into the fiber 30.

Radiation of the fiber 30 reaches the waveguiding material layer 320 in a corresponding manner via the deflection mirror, the first lens 200, the second lens 210, the pocket hole 310, and the deflection unit.

FIG. 4 additionally shows the structure of the plug receptacle 60 in greater detail. It may be seen that the second chip 2 and the third chip (intermediate chip 3) are each provided with a through hole 21, through which a chamfered pin end 41 of the guide pin 40 can be pushed in the direction of the substrate 30 of the photonic integrated chip 1.

The substrate 300 of the photonic integrated chip 1 preferably comprises positioning holes 22 in the form of pocket holes 310, into each of which the chamfered pin end 41 of a guide pin 40 can be inserted to ensure an alignment of the plug 50 not only in relation to the second and third chip, but rather also in relation to the photonic integrated chip 1. The chamfered pin ends 41 facilitate the insertion of the guide pins 40 and the centering of the guide pins 40 into the through holes 21 and/or the positioning holes 22.

FIG. 5 shows the plug 50 and the plug receptacle 60 according to FIG. 4, after the plug 50 has been inserted with its guide pins 40 completely into the plug receptacle 60. This may be seen in that the pin ends 41 of the guide pins 40 have reached the respective positioning hole 22 in the substrate 300 of the photonic integrated chip.

After the plugging together of plug 50 and plug receptacle 60, the chips 2 to 4 form the chip stack 20 according to FIG. 2.

The fourth chip 4 and the fifth chip (the fiber mount 5) are preferably connected to one another in a manner free of adhesive and/or solder to form the plug 50, in particular by Van-der-Waals bonding or thermal fusion bonding.

The photonic integrated chip 1, the second chip 2, and the third chip (intermediate chip 3) are preferably also connected to one another in a manner free of adhesive and/or solder to form the plug receptacle 60, in particular by Van-der-Waals bonding or thermal fusion bonding.

The outer side of the plug 50, which is formed in the exemplary embodiment according to FIGS. 1 to 4 by the outer face of the fourth chip 4 facing toward the plug receptacle 60, is preferably planar and is coated using an antireflective coating. In a corresponding manner, it is advantageous if the outer side of the third chip (intermediate chip 3) facing toward the fourth chip is also planar and is coated using an antireflective coating.

FIG. 6 shows the structure of the photonic integrated chip 1 already explained in conjunction with FIG. 4 in greater detail. The substrate 300, the partition layer 311 and the waveguiding material 320 can be seen, which have already been explained in conjunction with FIG. 4. In addition, an intermediate layer 330 can be seen in FIG. 6, which is applied to the side of the waveguiding material layer 320 facing away from the pocket hole 310.

The intermediate layer 330 has a thickness H and separates the waveguiding material layer 320 from a mirror layer 340 (for example, metal layer), which is arranged on the side of the intermediate layer 330 facing away from the pocket hole 310.

FIG. 6 additionally shows a coupler 350, which is formed in the waveguiding material layer 320 or is connected to an optical waveguide 360 formed in the waveguiding material layer 320.

The coupler 350 and the mirror layer 340 form a deflection unit 370, which can deflect radiation from the waveguide 360 in the direction of the pocket hole 310 and/or in the direction of the second lens 210. In a corresponding manner, the deflection unit 370 can couple radiation which comes from the second lens 210 and/or the pocket hole 310 into the waveguiding material layer 320 and/or into the optical waveguide 360. The coupling and decoupling in the direction of pocket hole 310 and/or waveguiding material layer 320 takes place partially directly and partially indirectly via the mirror layer 340, as indicated by arrows in FIG. 6.

In the backend-of-line 380, i.e., in further layers on the upper side of the photonic integrated chip 1, further mirror and/or metal layers can be integrated to form the deflection unit 370 and/or for other purposes.

The embodiment variants explained in conjunction with FIGS. 1 to 6 can comprise individual, multiple or all of the following features listed as bullet points alternatively or additionally to the above-described features:

- The lens parameters are preferably designed for single-mode beam guiding.
- The intermediate chip 3 preferably has a thickness of 500-1000 μm.
- There is a mechanical cover (for example, in the form of a support slat 81) made of silicon or an arbitrary other material for protection by covering of the fibers (acrylate without jacket) and for fixing the fiber arrangement.
- The chips 4-6, the fiber arrangement and the metal pins are fixedly connected to one another and form, with the lower part of the chip stack (chips 1-3) as the counterpart, a pluggable connection, which is also fixedly connected together and is soldered to a PCB (printed circuit board 70).
- There are grating couplers in the photonic integrated chip 1 (EPIC chip) having metal mirrors (mirror layers 340) in the backend-of-line 380 for the decoupling via the chip lower side.

On the lower side of the EPIC chip 1, regions are etched free by so-called local backside etching (LBE) up to the BOX (partition layer 311), in which or above which the grating couplers are located, preferably having a size of 120×45 μm2.

The optical radiation exits vertically or nearly vertically out of the EPIC chip. Angle range 0°-20°, preferably 19.5°.

Openings are located on the lower side of the EPIC chip, which are produced by so-called local backside etching as fixing points for the guide pins 40 (metal pins). The guide pins 40 preferably have a diameter of 400-500 μm.

A beam exiting from the EPIC chip 1 is incident non-centrally on the opposing lens 210 in the silicon chip 2, so that the beam is collimated after the lens 210 and extends vertically up to the lens 200 in the other silicon chip 4. The lens 200 focuses the beam on the fiber end face and deflects it away again at the same angle as the lens 200, so that the beam extends parallel to the fiber 30 located in the associated V-groove 51 after deflection by one of the anisotropically etched facets (deflection mirrors 52).

The lenses 200 and 210 in both silicon chips 2 and 4 have the same lens parameters.

The chips 2 and 4 are identical.

The lenses 200 and 210 in both silicon chips 2 and 4 are offset in relation to one another along the fiber axis in the plane of the chips. Together with the above-mentioned features, different angles may thus be implemented below the lens 210 and above the lens 200.

The lenses 200 and 210 are aspheric in at least one of the chips (for example, silicon chips).

The lenses 200 and 210 are elliptical in at least one of the chips (for example, silicon chips).

The lenses 200 and 210 are coated using an antireflective coating in at least one of the chips (for example, silicon chips).

The upper side of chip 3 and the lower side of chip 4 are coated using an antireflective coating.

The chips 1-3 and 4-5 are connected to one another by Van-der-Waals bonding or thermal fusion bonding, whereby optimum heat conduction is ensured and the transmitted beam does not experience Fresnel losses.

The EPIC chip 1 comprises contacts for flip chip connections on the upper side.

The EPIC chip 1 is bonded and electrically connected on a PCB (printed circuit board 70) using a flip chip method. Due to the separation of electrical and optical contacts on the upper and lower side of the EPIC chip 1, more space is available on the EPIC chip lower side for the connection of the EPIC chip 1 to the silicon chip stack 20 than in a variant in which the optical contacting is also carried out on the chip upper side. The mechanical stability of the chip stack 20 is enhanced due to the enlarged support surface.

The PCB is furthermore used as a carrier for a support element 80, preferably in the form of a potting compound (transfer mold), which mechanically stabilizes the chip stack together with the fiber arrangement (see FIGS. 1 and 2), whereby lesser deformations and thus a more robust optical coupling are achieved.

The PCB comprises contacts for a BGA soldered bond on the lower side (see FIG. 2).

To further reduce thermal effects, the heat arising in operation has to be dissipated. This preferably takes place via a heat sink, which is connected to the upper side of the silicon chip, which comprises the V-grooves.

The heat sink is screwed into a frame (carrier ring 100) fastened on the PCB for the fixation.

Instead of a heat sink, solely a fastening plate made of metal can also be used for the fixation of the fiber arrangement.

At least one laser chip, the radiation of which is coupled into a waveguide in the EPIC chip 1, is connected to the upper side of the EPIC chip 1.

The coupling of the laser radiation from the laser chip into the EPIC chip upper side takes place vertically or nearly vertically via grating couplers. Angle range 0°-20°, preferably 19.5°.

The PCB comprises at least one depression, into which the lasers which are attached to the EPIC upper side are countersunk.

The beam guiding is vertical and/or collimated.

The lenses 200 and 210 are horizontally offset.

The thickness of the substrate 300 is in a range 180-400 μm.

The potting compound forming the support element 80 enables a mechanical stabilization and facilitates the manual plugging in of the plug 60, since it can slide along the demolding bevel of the potting compound (upper region 83a) before the guide pins 40 ensure an alignment in sub-micron precision.

The thickness of the chip 3 is preferably at least 500 μm, so that the plug contact reserves sufficient depth for the pins 40, such that the plugging procedure is readily perceptible for a user.

The invention claimed is:

1. A photonic component (10) having a photonic integrated chip (1) and a fiber mount (5) mechanically connected to the photonic integrated chip (1), wherein the fiber mount (5) comprises:
   at least one groove (52), into which an optical fiber (30) is inserted, and
   at least one mirror surface (52), which reflects radiation (S) of the fiber (30) in the direction of the photonic integrated chip (1) and/or reflects radiation (S) of the photonic integrated chip (1) in the direction of the fiber (30),
characterized in that
   a chip stack (20) having at least two chips, of which one borders the fiber mount (5) and one borders the photonic integrated chip (1), is arranged between the photonic integrated chip (1) and the fiber mount (5),
   the chip stack (20) is provided with at least two through holes (21), and
   one guide pin (40) is guided through each of the at least two through holes (21) of the chip stack (20), which guide pin extends into an associated positioning hole in the fiber mount (5) and in the direction of the photonic integrated chip (1) and positions at least the chip stack (20) and the fiber mount (5) in relation to one another;
wherein
the fiber mount (5), the chip (4) of the chip stack (20) which borders the fiber mount (5) and the guide pins (40) are fixedly connected to one another and jointly form a plug (50), and
   the photonic integrated chip (1) and the chip (2) which borders the photonic integrated chip (1) are fixedly connected to one another and form a plug receptacle (60) and
   the guide pins (40) of the plug (50) are inserted into the plug receptacle (60).

2. The component as claimed in claim 1, characterized in that a first and second lens (200, 210) are opposite one another.

3. The component as claimed in claim 1, characterized in that the chips of the chip stack (20), the photonic integrated chip (1) and the fiber mount (5) are silicon chips.

4. The component as claimed in claim 1, characterized in that the first and second lens (200, 210) have the same focal length.

5. The optical component as claimed in claim 1, characterized in that the groove (52) in the fiber mount (5) is a V-groove (52) anisotropically etched in silicon and a deflection mirror (52) associated with the fiber (30) is formed in the fiber mount (5) by a face etched anisotropically into the silicon.

6. The optical component as claimed in claim 1, wherein the optical fiber (30) is a single mode fiber.

7. The optical component as claimed in claim 1, wherein the plug receptacle (60) is a socket.

\* \* \* \* \*